United States Patent
Jurgenson

[11] Patent Number: 5,959,807
[45] Date of Patent: Sep. 28, 1999

[54] HEAD SUSPENSION WITH MOTION RESTRAINING TETHERS

[75] Inventor: Ryan A. Jurgenson, Hutchinson, Minn.

[73] Assignee: Hutchinson Technology, Inc., Hutchinson, Minn.

[21] Appl. No.: 08/881,194

[22] Filed: Jun. 24, 1997

Related U.S. Application Data

[60] Provisional application No. 60/020,349, Jun. 24, 1996.

[51] Int. Cl.$^6$ .............................. G11B 5/60; G11B 21/21
[52] U.S. Cl. ............................................................ 360/104
[58] Field of Search ............................................ 360/104

[56] References Cited

U.S. PATENT DOCUMENTS

| | | | |
|---|---|---|---|
| 4,724,500 | 2/1988 | Dalziel | 360/103 |
| 5,473,487 | 12/1995 | Nagase | 360/104 |
| 5,530,606 | 6/1996 | Baasch et al. | 360/104 |
| 5,535,075 | 7/1996 | Takahashi et al. | 360/105 |
| 5,570,249 | 10/1996 | Aoyagi et al. | 360/104 |
| 5,612,840 | 3/1997 | Hiraoka et al. | 360/104 |
| 5,805,381 | 9/1998 | Resh | 360/104 |
| 5,877,920 | 3/1999 | Resh | 360/104 |

FOREIGN PATENT DOCUMENTS

| | | |
|---|---|---|
| 0834865A1 | 4/1998 | European Pat. Off. . |
| 9134577 | 5/1997 | Japan . |

*Primary Examiner*—Robert S. Tupper
*Attorney, Agent, or Firm*—Faegre & Benson, LLP.

[57] ABSTRACT

A head suspension is comprised of a read/write transducer head carrying region supported from a support region of the head suspension by a compliant area of the head suspension. The compliant area permits the head carrying region to move freely relative to the support region when in use in a rotary data storage device. Tethers of low stiffness material are connected between the head suspension head carrying region and support region. The tethers restrain the movement of the head carrying region relative to the support region to a limited range of movement and thereby reduce the probability of the head suspension slider and/or transducer head and the surface of the disk in the rotary data storage device in which the head suspension is employed from being damaged by otherwise unrestrained movement of the head carrying region of the head suspension resulting from a shock or jarring impact on the rotary data storage device.

19 Claims, 6 Drawing Sheets

HEAD SUSPENSION WITH MOTION RESTRAINING TETHERS

This application claims the benefit of U.S. Provisional Application Ser. No. 60/020,349 filed on Jun. 24, 1996.

BACKGROUND OF THE INVENTION

(1) Field of the Invention

The present invention pertains to a head suspension that is basically comprised of a read/write transducer head carrying region supported from a support region by a compliant area of the head suspension. The compliant area permits the head carrying region to move freely relative to the support region when in use in a rotary data storage device. Tethers of a low stiffness material are connected between the head carrying region and support region. The tethers restrain the movement of the head carrying region relative to the support region to a limited range of movement. Limiting the range of movement of the head carrying region reduces the probability of the head suspension slider and/or transducer head, and possibly the surface of the disk in the rotary data storage device in which the head suspension is employed, being damaged by impacting together by otherwise unrestrained movement of the head carrying region suspension resulting from a shock or jarring impact on the rotary data storage device.

(2) Description of the Related Art

Most personal computer systems today employ direct access storage devices (DASD) or rigid disk drives for data storage. A conventional disk drive contains a spindle that is rotated by an electric motor at several thousand revolutions of the spindle per minute. One or more magnetically coated recording disks are mounted on the spindle for rotation therewith at axially spaced positions along the spindle. The magnetic coating on the surface of these disks stores data.

Positioned adjacent the rotating disks is a head actuator column. The head actuator column typically has a plurality of actuator arms thereon, and each actuator arm supports one or more head suspensions that extend in cantilever fashion from the actuator arm to distal ends of the head suspensions. The head suspensions are very precise metal springs that hold read/write transducer heads, such as magnetic or optical heads, adjacent the surfaces of the rotating disks in the disk drive. The head suspensions are typically comprised of a proximal support region that attaches the head suspension to an actuator arm, a distal load region that carries the read/write head, and an intermediate spring region that biases the load region and the read/write head toward the rotating disk. The read/write heads are attached to sliders at the distal ends of each of the head suspensions. The plurality of actuator arms and their associated head suspensions support the sliders and read/write heads adjacent the top and bottom data storage surfaces of each of the plurality of disks supported by the spindle. The spring regions of the head suspensions bias the sliders and their heads toward these data surfaces and position the sliders and heads very precisely relative to the rotating data surfaces. In some disk drives, the spring regions of the head suspensions cause the transducer heads to actually slide along the data storage surfaces of the rotating disk, but typically the spring regions of the head suspensions exert a precise biasing force on the load region or head carrying region of the head suspension to cause the sliders and their attached read/write heads to "fly" on a cushion of air a minute distance from the data storage surfaces of the rotating disk. This cushion of air is created by the rotation of the disk relative to the slider and attached head.

The load region of a head suspension usually includes a load beam and the sliders and their read/write heads are supported at the distal end of each head suspension usually on a gimbal or a tongue of a flexure on the load beam. Each of these permits the slider and its attached head to pivot about a roll axis parallel to a center longitudinal axis of the head suspension and a pitch axis that is perpendicular to the roll axis. This enables the read/write transducer head to be positioned at a precise orientation to the data storage surface of the rotating disk to obtain optimum performance in transferring data between the data storage surface of the disk and the read/write head.

The compliant support provided by the proximal support region of the head suspension to the load region or head carrying region of the head suspension can result in damage to the transducer head and/or slider and possibly to the data storage surface of the disks if the rotary data storage device is subjected to a shock such as that produced by dropping a disk drive or striking a disk drive with sufficient force by another object. The initial impact of a sharp force with the disk drive housing can cause the head carrying region of the head suspension to move away from the data storage surface of the rotating disk due to the compliant connection between the load beam and the support region of the head suspension provided by the spring region. However, at some point the bias exerted by the spring region on the load beam will reverse the motion of the load beam and slider away from the data storage disk surface and move the load beam and slider back toward the disk storage surface. With this abrupt back and forth motion of the load beam, the compliant connection provided between the load beam and gimbal or tongue of a flexure connected to the load beam will cause the gimbal or flexure tongue, and its connected slider and transducer head, to move relative to the load beam as the load beam moves back toward the rotating disk surface. This can result in the slider and its attached transducer head being positioned at an angled orientation relative to the rotating disk surface, as opposed to the generally parallel orientation to the rotating disk surface when transferring information with this surface. The motion of the load beam back toward the rotating disk surface following the shock or impact exerted on the disk drive can result in the load beam causing the slider and/or the transducer head to contact the rotating data storage surface of the disk. Depending on the orientation of the transducer head and/or the slider as it comes into contact with the rotating disk surface, the impact force of contact can vary. For example, the corner of a transducer head and/or slider contacting the rotating disk surface will exert a greater impact force than if the head and slider were oriented with surfaces parallel to the rotating data storage surface of the disk at impact. Point impact of a corner of the head and/or slider with the disk surface can result in damage to the head and/or slider and possible damage to the data stored on the surface of the disk.

If a head suspension could be constructed that would restrain the movement of the head carrying region of the head suspension, for example the gimbal or the flexure tongue, following a significant shock or impact force so that the slider and its head maintain surfaces oriented substantially parallel with the rotating data storage surface of the disk, then the force of impact of the slider and/or its head with the data storage surface of the disk would be dissipated over a greater area of contact and thereby lessen the possibility of causing damage to the transducer head, the slider and/or the data storage surface of the disk.

Prior art head suspensions have been provided with mechanical shock movement limiters. These were usually comprised of a protruding tab on one of either the load beam and the head carrying region of the head suspension, for example the flexure tongue, which protruded through an aperture in the other of the load beam and flexure tongue. The length of the projection extending through the aperture would define the range of movement permitted between the load beam and flexure tongue. The distal end of the projection would have a bent over head that would engage against a side edge of the aperture if the movement between the load beam and flexure tongue due to shock impact exceeded the length of the projection. In this manner, relative movement between the load beam and the flexure tongue due to shock impact was limited. However, the construction of these prior art mechanical shock movement limiters required several additional manufacturing steps in constructing the individual component parts, and then also required additional manufacturing steps in assembling these component parts to each other. Furthermore, these mechanical shock movement limiters abruptly stopped relative movement between component parts of a head suspension when the maximum range of movement was reached.

The shock movement limiter of the prior art could be improved upon if it could be manufactured more inexpensively without appreciably increasing the number of manufacturing steps required for a head suspension employing the shock movement limiter. The mechanical shock movement limiter could also be further improved upon if it would exert a restraining force against relative movement between the load beam and the flexure tongue throughout the range of relative movement permitted, i.e. the restraining force would increase as the range of relative movement increased up to the maximum relative movement between these component parts permitted by the motion limiter.

SUMMARY OF THE INVENTION

The present invention is directed to a shock motion limiter that gradually increases a restraining force against relative movement between a support region of a head suspension and a region of the head suspension that supports the read/write head and its slider for free movement about pitch and roll axis. The shock movement limiter of the invention is provided on the head suspension by modifying a manufacturing step already practiced in constructing the head suspension and thereby does not appreciably increase the manufacturing costs of the head suspension.

In a first embodiment of the invention, the shock movement limiter is employed on a three piece head suspension, i.e., a head suspension comprised of a load beam, a flexure and a support base. However, the shock movement limiter of the invention may be employed in various different types of head suspensions and is not limited to use with only three piece head suspensions.

In the flexure of the head suspension, a tongue of the flexure carries the slider and transducer head and is constructed to permit their free movement about pitch and roll axes relative to a base of the flexure. The base of the flexure is in turn securely held to the distal end of the load beam by spot welds or other equivalent methods. A void or aperture separates the flexure tongue from the flexure base and defines a compliant area that permits free movement of the tongue relative to the base. The distal end of the load beam is connected to a proximal end of the load beam by a spring region, as is conventional. A support base of the load beam is provided at its proximal end and connects the load beam to the actuator arm of a disk drive, as is conventional.

Electrical conductors communicate with the transducer head at the distal end of the load beam and extend along the longitudinal length of the load beam to terminals of the conductors positioned adjacent the load beam proximal end. The conductors are insulated from the metal of the flexure and load beam by a layer of low stiffness, insulating material. In the preferred embodiment, the insulating material is a polyimide. Sections of the insulating material may also be employed as bond pad spacers on the flexure tongue between the flexure tongue and the slider.

In the first embodiment of the invention, tethers are provided connecting a support region of the head suspension defined by the load beam and the flexure base, to a head carrying region of the head suspension defined by the flexure tongue. The tether is formed as an extension of the insulating material layer. Therefore, including the tether in the construction of the head suspension does not appreciably increase its manufacturing cost. In one embodiment the tether extends from the flexure base to the flexure tongue along the longitudinal axis of the head suspension and thereby restrains the range of movement of the flexure tongue relative to the flexure base and the load beam about the pitch axis.

In a variant embodiment, tethers are formed extending laterally across the void between the flexure tongue and the flexure base on opposite sides of the flexure tongue. These tethers restrain the range of movement of the flexure tongue relative to the flexure base and the load beam about the roll axis of the head suspension. Additionally, it is preferable that the tethers are located at the pitch axis and/or roll axis to minimize their effect on pitch and roll stiffness of the flexure.

In a still further variant embodiment, tethers are provided crossing the void between the flexure tongue and the flexure base parallel to both the pitch and roll axes.

In a further embodiment of the tethers of the invention, the load beam and its attached flexure together comprise the head carrying region of the head suspension. This head carrying region is connected to the support base or support region of the head suspension by a spring region of the head suspension. The spring region is formed in the head suspension in any conventional manner and defines the compliant area that permits free movement of the head carrying region relative to the support region. A pair of arms extend from the support region and are spaced laterally outside the spring region with a void between the arms and the spring region. A pair of tethers constructed of the low stiffness material extend from these arms across the voids adjacent the spring region and connect the arms to the load beam and the head carrying region of the suspension. The tethers constructed of low stiffness material may be extensions of the insulating material employed in the previously described embodiments and restrain the shock movement of the head carrying region of the suspension relative to the support region of the suspension in a similar manner to that of the previously described embodiments.

In each of the embodiments of the tethers, the tethers provide a restraint to shock movement of the head carrying region of the head suspension relative to the support region of the head suspension that limits the range of movement of the head carrying region relative to the support region as a result of a shock impact, while not appreciably affecting the freedom of movement of the head carrying region about the pitch and roll axis of the head suspension.

BRIEF DESCRIPTION OF THE DRAWINGS

Further objects and features of the present invention are set forth in the following detailed description of the preferred embodiments of the invention and in the drawing figures wherein.

DETAILED DESCRIPTION OF THE PREFERRED EMBODIMENTS

Figure 1:
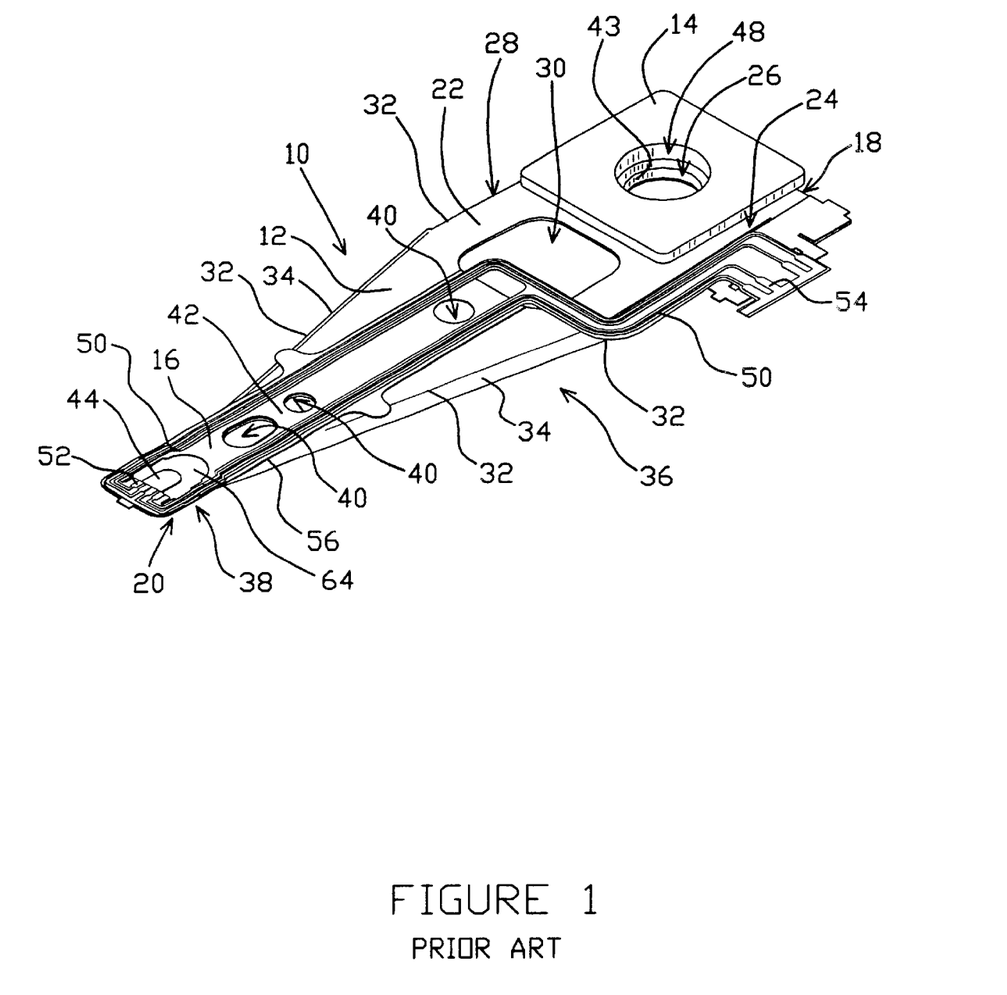
FIG. 1 is an isometric view of a typical head suspension with which the tethers of the invention are used.

FIG. 1 shows the conventional construction of a prior art head suspension with which the subject matter of the invention may be employed. The head suspension 10 shown in FIG. 1 is commonly described as a three piece head suspension in that it is basically comprised of a load beam 12, a support base 14, and a flexure 16. The construction of the head suspension 10 and the specific configurations of its three component parts are illustrative only. The novel feature of the invention is the addition of tethers that tie the read/write head carrying portion of the head suspension, which is designed to move freely about pitch and roll axes of the head suspension in use, to more stationary portions of the head suspension. The tethers thereby restrain the movement of the head carrying portion to within a desired range of movement without appreciably affecting its freedom of movement about the pitch and roll axes.

The description of the subject matter of the invention to follow should not be interpreted as being limited to a particular construction of a head suspension such as that shown in FIG. 1, but it should be understood that the concept of the invention may be employed with various different types of head suspension constructions, including those having a three piece construction in which the flexure carries the read/write head such as that shown in FIG. 1, as well as head suspension constructions employing gimbals for carrying the read/write head. Because the tethers may be employed on various different constructions of head suspensions, they will be described as connecting a head carrying region of the suspension to a supporting region of the head suspension where the head carrying region and supporting region are separated by a compliant area. The compliant area of the head suspension permits the head carrying region to move freely about the pitch and roll axes relative to the supporting region. In different head suspension constructions, different component parts will make up the head carrying region, the supporting region, and the compliant area of the suspension. It is believed that most any type of head suspension having a read/write head carrying region that supports the read/write head for pitch and roll movement, relative to a support region of the head suspension that supports the head carrying region, may employ the tether concept of the invention and thereby limit the range of free movement of the head carrying region of the head suspension relative to the support region of the head suspension. Therefore, the component parts of the head suspension with which the tethers are employed will be described only generally.

The load beam 12 has a longitudinal length with opposite proximal 18 and distal 20 ends and typically is constructed of a thin sheet of stainless steel. However, the load beam 12 could also be constructed of other conventionally used materials. The beam has a bottom surface 22 and a top surface (not visible in FIG. 1), although the reference to opposite top and bottom surfaces is illustrative only as these surfaces may change depending on the particular positioning of the head suspension in a rotary data storage device. A support region 24 of the load beam has an aperture 26 passing therethrough.

A spring region 28 is provided on the load beam 12 with an aperture 30 that passes through the load beam adjacent the support region 24. Although an aperture 30 is shown in the spring region 28, the aperture could be replaced by a lateral groove or trough of reduced thickness in the material of the load beam that is provided between the opposite lateral side edges 32 of the load beam by partial etching. Other conventional methods of providing a spring region in a head suspension may also be employed. Although not shown in FIG. 1, the spring region 28 of the load beam is typically bent or rolled to give the beam a downward slant or a slant toward its bottom surface 22 that biases the beam against the air cushion or air bearing that acts against the head carrying region of the head suspension in use of the head suspension in a rotary data storage device.

From adjacent the spring region 28, the opposite lateral edges 32 of the load beam begin to taper toward each other as they extend longitudinally to the load beam distal end 20. The opposite lateral edges 32 also have bent rails 34 that provide additional stiffness to this portion of the load beam. The rails 34 define a support region 36 of the load beam that supports a head carrying region 38 of the head suspension 10 to be described. Alignment and tooling apertures 40 are also provided through the support region 36 of the load beam, as is conventional. In variations of the head suspension with which the subject matter of the invention is employed, the rails 34 along the opposite lateral side edges of the load beam may be omitted.

The flexure 16 is secured to the load beam bottom surface 22 adjacent its distal end 20 by laser welds or other equivalent methods. The flexure 16 supports the slider and read/write transducer head (not shown) as is known in the art. The particular configuration of the flexure 16 shown in the drawing figures is illustrative only. Alternatively, depending on the application of the suspension, the distal end of the load beam could be formed with a gimbal for supporting the slider and transducer head. The flexure 16 is basically comprised of a base 42 that is secured to the load beam 12 and forms a part of the load beam support region 36, and a flexure tongue 44 that carries the slider and transducer head (not shown). In the head suspension 10 of FIG. 1, the flexure tongue 44 provides the head carrying region 38 of the head suspension. As shown in FIG. 1, the flexure tongue 44 projects longitudinally toward the load beam proximal end 18 and is surrounded on three sides by a void 64 or aperture through the flexure. The void 64 creates a compliant area in the flexure that enables the flexure tongue to move freely about pitch and roll axes of the head suspension. The connection of the flexure tongue 44 to the flexure base 42, and in turn the flexure base's connection to the load beam 12 permits the flexure tongue to move freely about the pitch and roll axes relative to the load beam 12, as is conventional. Although a particular construction of the flexure tongue and flexure base is shown in FIG. 1, there are various different types of flexure constructions known in the prior art and the tethers of the present invention may be used with these various different types of constructions.

The construction of the load beam support base 14 is conventional. The particular support base shown in FIG. 1 is illustrative only, and the configuration of the support base can change depending on the particular application of the head suspension. The support base 14 is secured to the load beam bottom surface 22 by laser welds, adhesives or other known methods. A swaging boss 42 having a center bore 48 passes through the aperture 26 in the load beam support region 24 and is typically employed in connecting the head suspension 10 to an actuator arm (not shown) of a rotary data storage device.

A series of electrical conductors 50 extends from the distal terminals 52 of the conductors on the distal end of the flexure 16 across the bottom surface of the flexure to proximal terminals 54 of the conductors positioned adjacent the load beam proximal end 18. The electrical conductors 50 are insulated from the metal material of the load beam 12 and flexure 16 by a layer of insulating material 56 applied to the underside of the load beam and flexure. The layer of insulating material 56 as shown in FIG. 1 provides an insulating layer between the electrical conductors and the load beam and flexure along the entire length of the conductors 50. Various different types of insulating materials may be used for this layer of insulation. The insulating material 56 could include properties that cause it to adhere to the surfaces of the load beam 12 and flexure 16, or could be held to these surfaces by an adhesive. Likewise, the electrical conductors 50 could be held to the layer of insulating material 56 by the properties of the material itself, or by an adhesive. In the preferred embodiment, the layer of insulating material is a low stiffness material, preferably polyimide.

The preceding description of the head suspension 10 shown in FIG. 1 is all conventional construction known in the prior art. The subject matter of the invention, the tethers that restrain movement of the head carrying region 38 relative to the support region 36 resulting from a shock or sudden jarring movement of the rotary data storage device in which the head suspension is used will now be described with reference to FIGS. 2–6. Like component parts of the head suspension 10 of FIG. 1 shown in FIGS. 2–6 are given their same reference numerals.

Figure 2A:
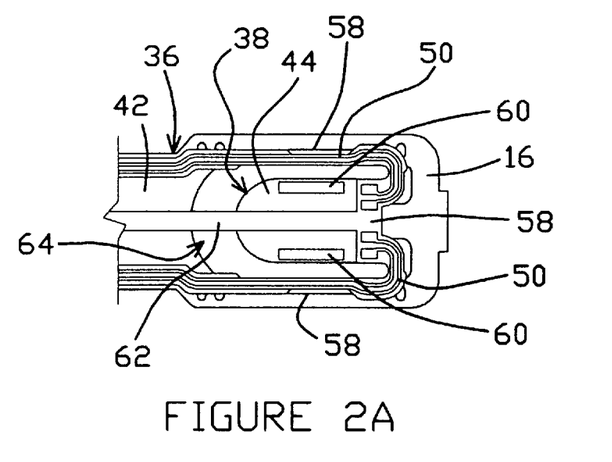
FIGS. 2A–2C are partial views showing the layered construction of the head suspension of FIG. 1 to which a tether of the invention has been added.
Figure 2B:
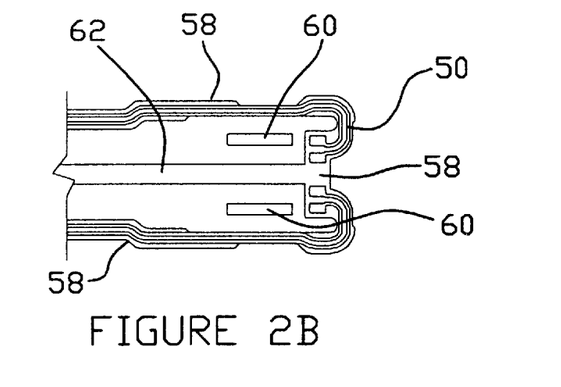
Figure 2C:
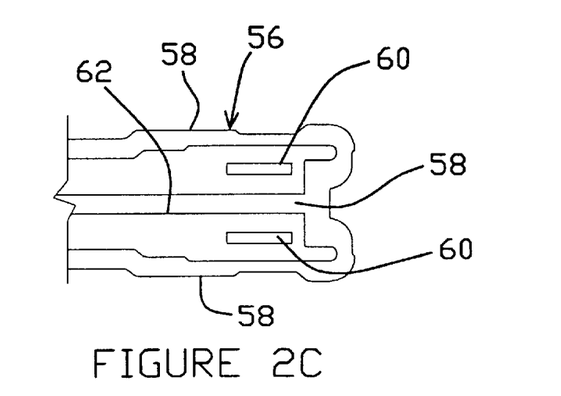

FIG. 2A shows a first embodiment of the tethers of the present invention employed on a head suspension such as that shown in FIG. 1. The drawing FIGS. 2A–2C illustrate the laminate construction of the head suspension adjacent its distal end 20. FIG. 2B shows the electrical conductors 50 and the layer of low stiffness, insulating material 56. FIG. 2C shows only the layer of insulating material 56.

Shown in FIG. 2A is the underside of the head suspension flexure 16 shown in FIG. 1, modified with the tether of the present invention. The flexure 16 includes the flexure base 42 secured to the load beam 12 and the flexure tongue 44. As explained earlier, in this embodiment the flexure base 42, as well as the portion of the load beam 12 to which it is attached, comprise the support region 36 of the head suspension, and the flexure tongue 44 comprises the head carrying region 38 of the head suspension, although a slider and read/write head transducer are not shown in FIGS. 2A–2C. The support region 36 of the head suspension supports the head carrying region for substantially free movement of the head carrying region 38 about the pitch and roll axes relative to the support region.

Secured directly to the underside of the flexure 16 is the layer of insulating material 56. The layer of insulating material 56 has the configuration shown in FIG. 2C. A first portion 58 of the layer insulates the electrical conductors 50 from the flexure 16. Second portion segments of the layer 60 serve as bond pad spacers on the flexure tongue 44 for the slider. A third portion 62 serves as the tether of the invention and connects the flexure base 42 to the flexure tongue 44. The third portion 62 is an extension of the first portion and can be added to the construction of the head suspension without appreciably increasing manufacturing steps or costs.

FIG. 2C shows the layer of insulating material 56 removed from the flexure 16 and the electrical conductors 50. It can be seen in FIG. 2C that the first portion 58 of the layer of insulating material has a specific configuration designed to underlie the electrical conductors 50 and insulate the electrical conductors from the flexure 16. The second portions 60 of the insulating material are configured to underlie the slider (not shown) when it is attached to the flexure tongue 44. The third portion 62 of the layer of insulating material extends across the void 64 between the flexure tongue 44 and the flexure base 42. This void 64 functions as a compliant area of the head suspension 10 that permits the flexure tongue 44 to move freely about pitch and roll axes relative to the flexure base 42 and the support region 36 of the head suspension, as is known in the prior art. By attaching the tether of the third region 62 of insulating material across the void 64 connecting the flexure base 42 with the flexure tongue 44, it can be seen that the tether 62 will restrain the movement of the flexure tongue 44 relative to the base 42 about the pitch axis, and to a lesser extent about the roll axis. In this manner, the tether 62 functions to limit the movement of the flexure tongue 44 relative to the flexure base 42 to prevent the situation described earlier where a shock and sudden jarring movement of the rotary data storage device will cause the support region 36 of the head suspension 10 to move away from a disk of the storage device. It can be seen that as the flexure tongue 44 moves further away from the flexure base 42, the restraining force of the tether increases until it reaches its maximum, at which point the flexure tongue movement is stopped. By restraining the range of movement of the flexure tongue 44 relative to the flexure base 42, the tether 62 maintains the orientation of a slider (not shown) attached to the flexure tongue 44 of the flexure 16 in a more parallel orientation relative to the surface of the disk and thereby would dissipate the force of impact of the slider and/or transducer head with the disk surface when the spring region 28 of the head suspension 10 moves the slider back toward the disk surface after the initial shock to or jarring movement of the rotary data storage device.

Figure 3A:
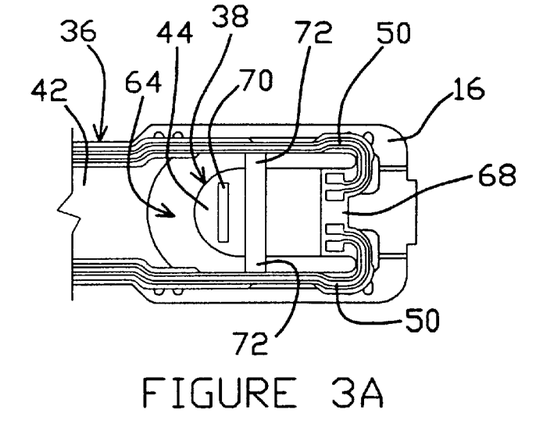
FIGS. 3A–3C are partial views showing an alternative to the tether construction of the head suspension of FIG. 2.
Figure 3B:
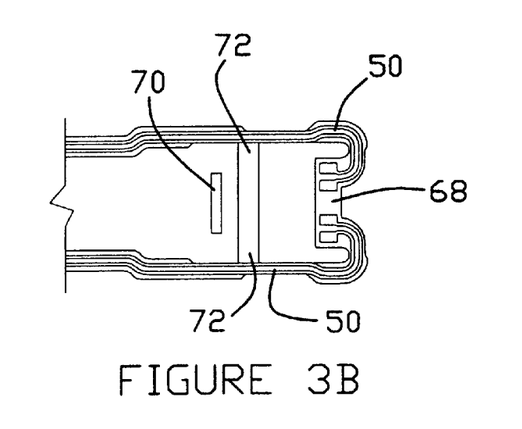
Figure 3C:
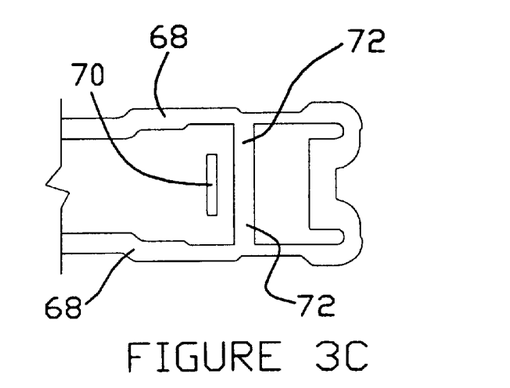

FIGS. 3A–3C show a variation of the tether of the invention. This variation is very similar to that of the tether shown in FIGS. 2A–2C and is an extension of the layer of insulating material 56 applied to the underside of the flexure 16 just as in the previously described embodiment. The layer of insulating material is provided with a first portion 68 that underlies the electrical conductors 50 of the head suspension. A second portion 70 of the insulating material is positioned on the flexure tongue 44 and is employed as a bond pad spacer for the slider (not shown). A third portion 72 of the insulating material is formed as the tether that extends laterally across the flexure tongue 44 and the void 64 on opposite lateral sides of the tongue, connecting the flexure tongue to the flexure base 44. In this embodiment, the portion of the tether 72 that extends across the underside of the flexure tongue 44 may also be used as a bond pad spacer for the slider (not shown). This embodiment of the tether will also function as the previously described embodiment in restraining movement of the head carrying region 38 of the head suspension relative to the support region 36.

Figure 4A:
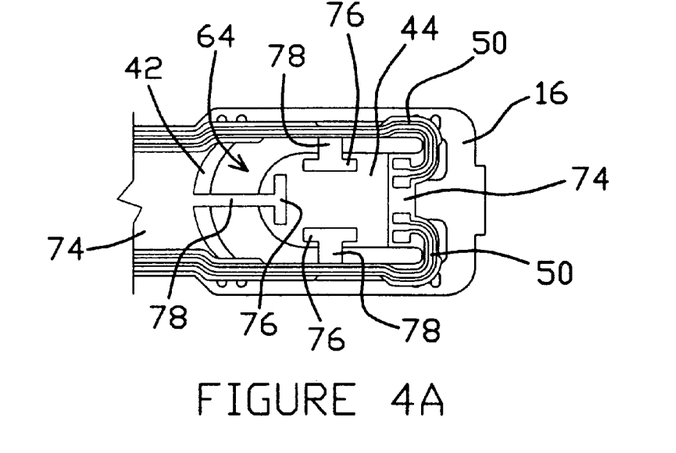
FIGS. 4A–4C are partial views showing a still further variation of the tethers added to the head suspension of FIG. 2.
Figure 4B:
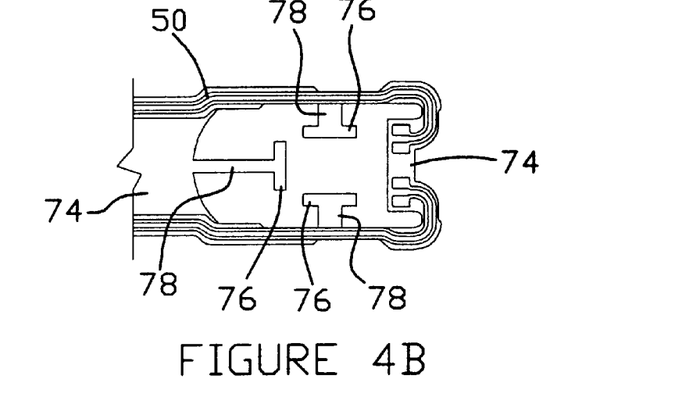
Figure 4C:
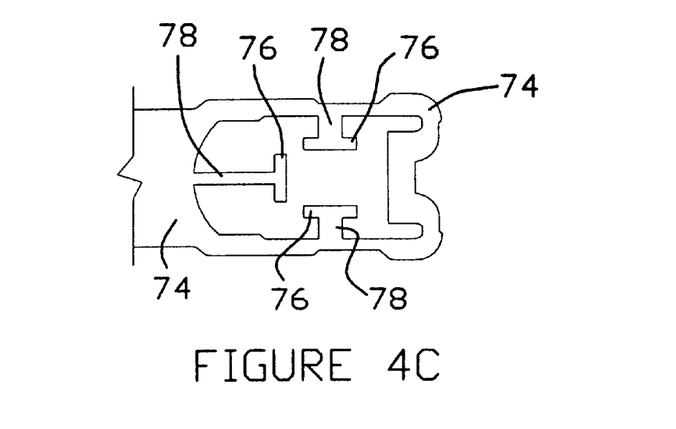

FIGS. 4A–4C show a still further variation of the tethers of the invention. This variation is a combination of the tethers of FIGS. 2A–2C and 3A–3C. In FIGS. 4A–4C, the layer of insulating material is formed with a first portion 74 that underlies the electrical conductors 50, second portions 76 that function as bond pad spacers for the slider (not shown) on the underside of the flexure tongue 44, and third portions 78 that function as the tethers. As best seen in FIG. 4A, the three tether portions 78 each extend across the void 64 between the flexure tongue 44 and the flexure base 42 and connect with the three second portions 76 of insulating material that function as the bond pad spacers. The three tether portions 78 are also connected to the first portion 74 of insulating material that underlies the conductors 50. In this manner, the layer of insulating material is formed as a single continuous layer of material that functions as the bond pad spacers, insulators for the electrical conductors, and the tethers.

Figure 5:
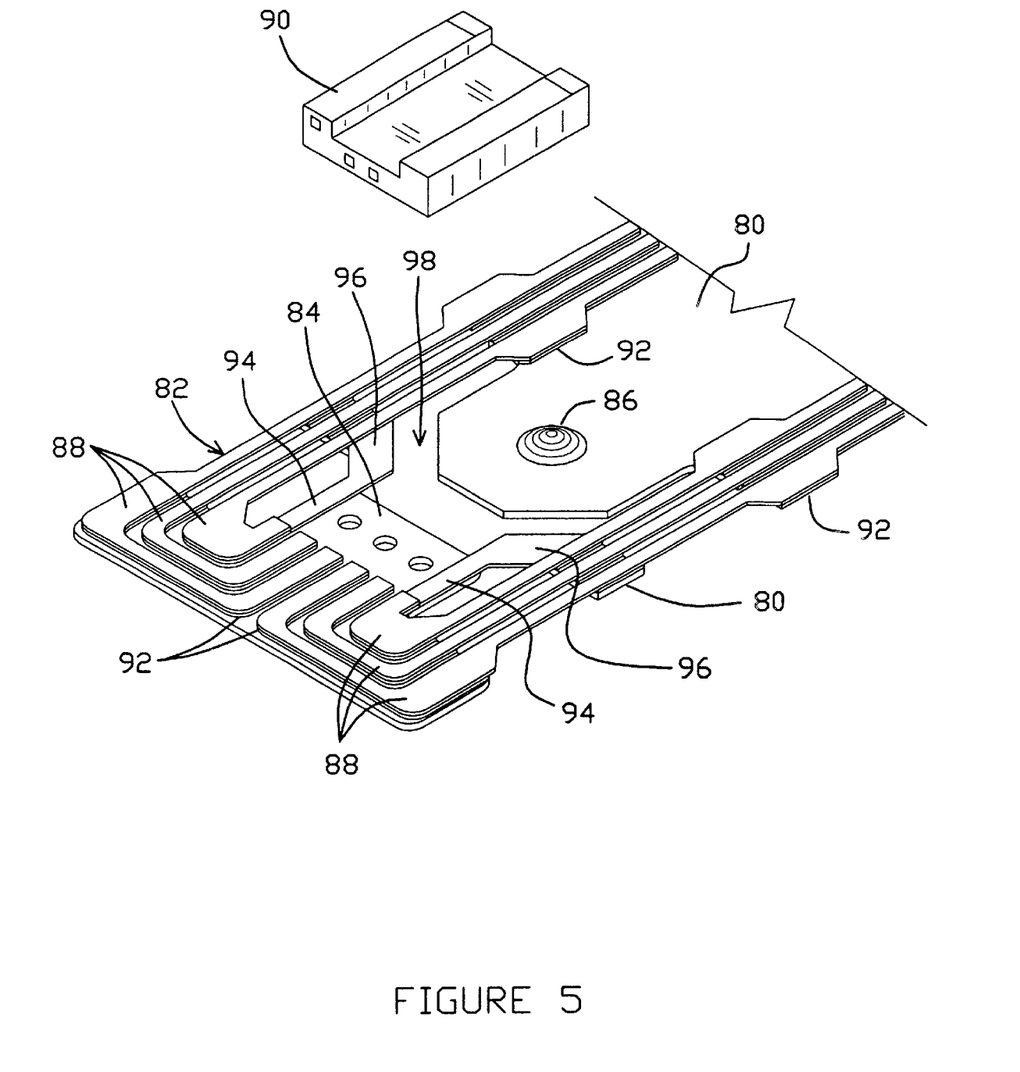
FIG. 5 is a partial, isometric exploded view of a further variation of the tethers of the invention.

FIG. 5 shows a partial view of a head suspension distal end employing the tethers of the invention with a flexure 80 having a head carrying region 82 provided by a flexure tongue 84, and a load point or dimple 86 provided on the flexure. The construction of the flexure 80, its tongue 84, and load point 86 is typical and is illustrative only of the use of the tethers of the invention with a head suspension of this type. As in the previously described embodiments, the layer of insulating material insulates the electrical conductors 88 from the underside of the flexure 80, as well as providing portions for bond pad spacers for the slider 90 (shown removed from the bond pad spacers in FIG. 5) and the tethers. The layer of insulating material is comprised of a first portion 92 that underlies the conductors 88 and insulates them from the flexure 80, second portions 94 that function as the bond pad spacers on the tongue 84 for the slider 90, and third portions 96 that are formed as the tethers. As seen in FIG. 5, the pair of tethers 96 extend across the void 98 separating the flexure tongue 84 from the base of the flexure 80. In employing the tethers 96 of the invention in this type of head suspension, it is desirable that the connection of the tethers 96 to the flexure base 80, which functions as the support region of the head suspension, be as close as possible to a lateral line (not shown) passing through the center of the load point 86. Although it is preferred that the connection of the tethers 96 to the flexure base 80 be close to this lateral line, the tethers 96 should not contact or interfere with the portion of the flexure on which the load point 86 is positioned to avoid their limiting the movement of the load point 86 relative to the remainder of the flexure and the head suspension. The functioning of the tethers 96 shown in FIG. 5 is substantially the same as that described with reference to previous embodiments.

Figure 6:
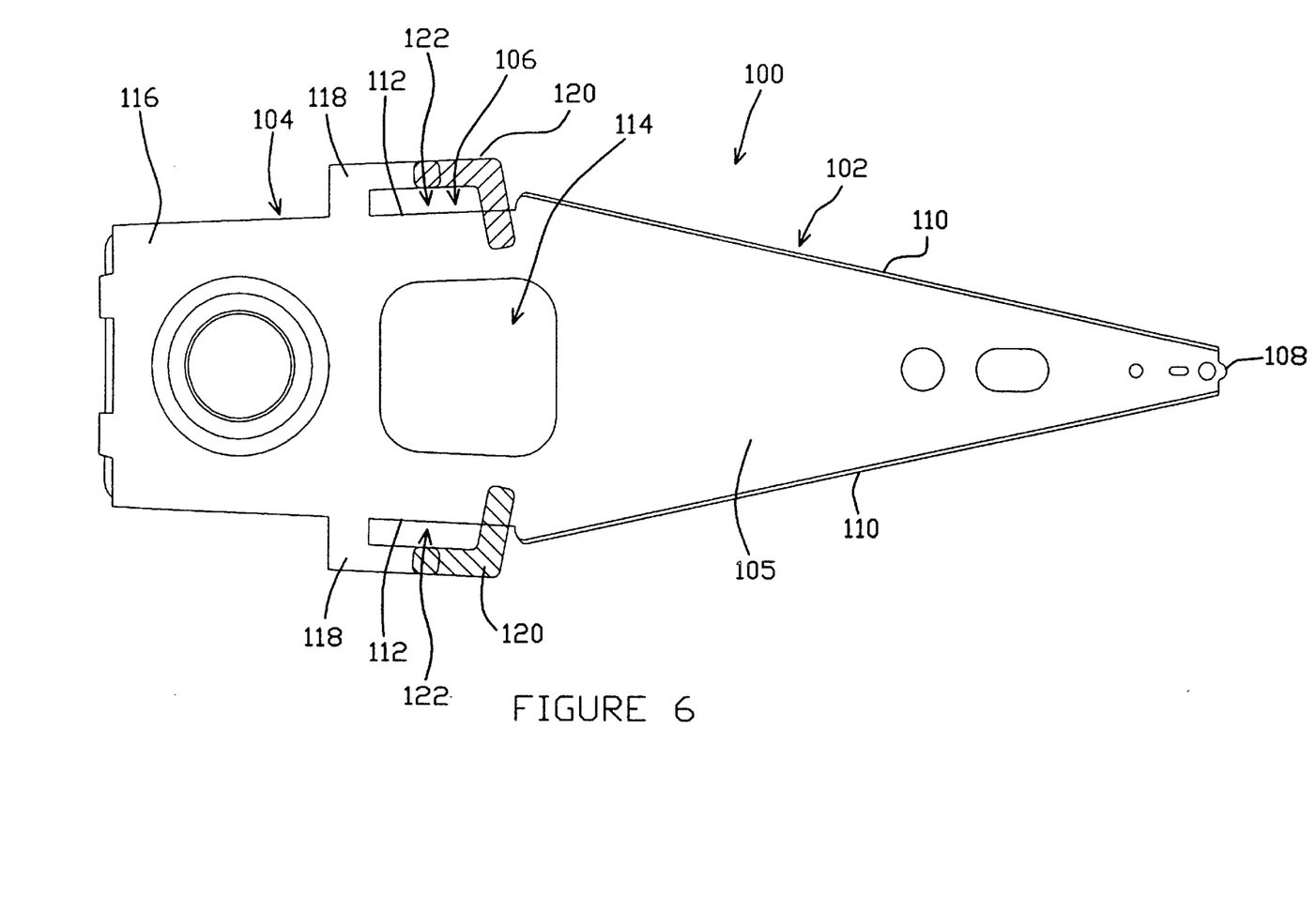
FIG. 6 is a plan view of a further embodiment of the tethers on a head suspension.

FIG. 6 is an illustration of a head suspension 100 in which tethers are employed for the same purpose of restraining movement of the head carrying region 102 of the head suspension relative to the support region 104, without appreciably affecting the free movement of the head carrying region about pitch and roll axes in use of the head suspension in a rotary data storage device. However, in the previously described embodiments, the support region of the head suspension was provided by the load beam and flexure base and the head carrying region was provided by the flexure tongue. In the FIG. 6 embodiment, the support region is provided by the support base of the head suspension and the head carrying region is provided by the load beam.

The head suspension 100 is very similar to the earlier described conventional head suspension of the prior art shown in FIG. 1 and therefore will be described in only general terms. This head suspension 100 of FIG. 6 includes a head carrying region 102 provided by a portion of the load beam 105 that extends from a spring region 106 of the head suspension to the distal end 108 of the head suspension. Although not visible, a flexure is supported on the underside of the load beam 105 adjacent the head suspension distal end 108, as is conventional. Also, the head carrying region 102 of the suspension is shown with lateral side rails 110. It should be understood that these lateral side rails could be omitted if not needed.

The head suspension spring region 106 has opposite lateral side edges 112 and may have an aperture 114 through the head suspension, as is conventional construction for reducing spring rates. Alternatively, other means to reduce spring rate may be employed such as a reduced thickness groove may be formed by partial etching laterally across the head suspension in the spring region 106 between the opposite lateral side edges 112.

The head suspension spring region 106 connects the load beam 105 of the head carrying region 102 with the support base 116 of the support region. The support base 116 is constructed for its connection to an actuator arm (not shown) of a rotary data storage device, as is known in the art. With the head carrying region 102 of the head suspension being connected by the spring region 106 to the support region 104 of the head suspension, the head carrying region 102 is connected for movement relative to the support region 104.

The head suspension 100 of FIG. 6 differs from the constructions of prior art head suspensions in that it is provided with a pair of projecting arms 118 from its opposite lateral side edges 112. These arms 118 are extensions from the opposite lateral side edges of the load beam at the support region 104 of the head suspension 100.

Connected between the pair of arms 118 and the head carrying region 102 of the head suspension are a pair of tethers 120 constructed of the insulating low stiffness material. The pair of tethers 120 extend across a pair of voids 122 positioned between the arms 118 of the support region 104 and the opposite lateral side edges 112 of the head suspension head carrying region 102. The tethers 120 extending across the voids 122 and connecting the support region 104 to the head carrying region 102 of the head suspension restrain the movement of the head carrying region 102 relative to the support region 104 and thereby prevent the excessive movement associated with a sudden shock or jarring impact on the rotary data storage device in which the head suspension 100 is employed. In this manner, the pair of tethers 20 function in substantially the same manner as the tethers of the previously described embodiments.

While the present invention has been described by reference to a specific embodiment, it should be understood that modifications and variations of the invention may be constructed without departing from the scope of the invention defined in the following claims.

What is claimed is:

1. A head suspension for supporting a read/write head adjacent a rotary data storage device, the head suspension having a longitudinal length with opposite proximal and distal ends, a support region of the head suspension adjacent the proximal end, a head carrying region of the head suspension adjacent the distal end, the support region supports the head carrying region with a compliant area of the head suspension therebetween which enables the head carrying region to move relative to the support region, a tether of low stiffness material extending across the compliant area connecting the support region to the head carrying region and restraining movement of the head carrying region relative to the support region; and the head suspension has opposite top and bottom surfaces, an insulator layer to insulate the head suspension from electrical conductors is applied to one of the head suspension top and bottom surfaces, and the low stiffness material of the tether is an extension of the insulator layer.

2. The head suspension of claim 1, wherein the low stiffness material of the tether and the insulator layer are both comprised of polyimide.

3. The head suspension of claim 1, wherein the head suspension includes a load beam and a gimbal adjacent the distal end of the head suspension, the gimbal is the head carrying region of the head suspension and the load beam is the support region of the head suspension with the compliant area therebetween.

4. The head suspension of claim 3, wherein the compliant area is a void between the load beam and the gimbal and the tether extends across the void connecting the load beam to the gimbal and restraining movement of the gimbal relative to the load beam.

5. The head suspension of claim 1, wherein the head suspension includes a load beam and a flexure, the flexure has a base connected to the load beam and a tongue projecting from the base and moveable relative to the base, the flexure tongue is the head carrying region of the head suspension and the flexure base and the load beam together are the support region of the head suspension with the compliant area between the flexure tongue and the flexure base and load beam.

6. The head suspension of claim 5, wherein the compliant area is a void between the flexure base and tongue and the tether extends across the void connecting the flexure base to the tongue and restraining movement of the flexure tongue relative to the base.

7. A head suspension for supporting a read/write head adjacent a rotary data storage device, the head suspension having a longitudinal length with opposite proximal and distal ends, a support region of the head suspension adjacent the proximal end, a head carrying region of the head suspension adjacent the distal end, the support region supports the head carrying region with a compliant area of the head suspension therebetween which enables the head carrying region to move relative to the support region, a tether of low stiffness material extending across the compliant area connecting the support region to the head carrying region and restraining movement of the head carrying region relative to the support region; and the compliant area of the head suspension is a spring region of the head suspension that connects the support region to the head carrying region, and the tether is connected between the support region and the head carrying region across the spring region.

8. The head suspension of claim 7, wherein the head suspension has opposite lateral side edges, the tether extends across a lateral side edge at the support region and the head carrying region of the head suspension and the tether is positioned laterally spaced from a lateral side edge at the spring region of the head suspension.

9. The head suspension of claim 7, wherein the head suspension has opposite lateral side edges, the tether is one of a pair of tethers of low stiffness material connecting the support region to the head carrying region, and each tether of the pair extends across a lateral side edge at the support region and the head carrying region of the head suspension and is positioned laterally spaced from a lateral side edge at the spring region of the head suspension.

10. A head suspension for supporting a read/write head adjacent a rotary data storage device, the head suspension having a longitudinal length with opposite proximal and distal ends, a support region of the head suspension adjacent the proximal end, a head carrying region of the head suspension adjacent the distal end, the support region supports the head carrying region with a compliant area of the head suspension therebetween which enables the head carrying region to move relative to the support region, a tether of low stiffness material extending across the compliant area connecting the support region to the head carrying region and restraining movement of the head carrying region relative to the support region;

the compliant area of the head suspension is a void between the support region and the head carrying region that the tether extends across in connecting the support region to the head carrying region; and the suspension has opposite lateral side edges, the compliant area of the head suspension also includes a spring region in the head suspension that connects the support region to the head carrying region, the void is one of a pair of voids on laterally opposite sides of the spring region, and the tether is one of a pair of tethers of low stiffness material connecting the support region to the head carrying region, each tether of the pair of tethers extends across a lateral side edge at the support region, one of the pair of voids and a lateral side edge at the head carrying region of the head suspension.

11. The head suspension of claim 10, wherein each tether of the pair of tethers is positioned laterally spaced from a lateral side edge at the spring region of the head suspension.

12. A head suspension for supporting a read/write head adjacent a rotary data storage device, the head suspension having a longitudinal length with opposite proximal and distal ends, a support region of the head suspension adjacent the proximal end, a head carrying region of the head suspension adjacent the distal end, the support region supports the head carrying region for movement of the head carrying region relative to the support region, a void is positioned between the support region and the head carrying region and a tether of low stiffness material extends across the void connecting the support region to the head carrying region and restraining movement of the head carrying region relative to the support region; and a layer of the low stiffness material is applied to the head suspension to insulate the head suspension from electrical conductors and the low stiffness material of the tether is an extension of the layer of low stiffness material.

13. The head suspension of claim 12, wherein the low stiffness material of the tether is polyimide.

14. The head suspension of claim 12, wherein the head suspension includes a load beam that extends along at least a portion of the longitudinal length of the head suspension and provides the support region of the head suspension; and a gimbal on the load beam adjacent the distal end of the head suspension and providing the head carrying region of the head suspension, where the void is between the load beam and the gimbal.

15. The head suspension of claim 14, wherein the tether extends across the void and is connected to both the load beam and the gimbal and restrains movements of the gimbal relative to the load beam.

16. The head suspension of claim 12, wherein the head suspension includes a load beam and a flexure, the flexure has a base connected to the load beam and a tongue projecting from the base and movable relative to the base, the flexure base provides the support region of the head suspension and the flexure tongue provides the head carrying region of the head suspension with the void being in the flexure between the flexure base and the flexure tongue.

17. The head suspension of claim 16, wherein the tether extends across the void and is connected to both the flexure base and the flexure tongue and restrains movement of the tongue relative to the base.

18. A head suspension for supporting a read/write head adjacent a rotary data storage device, the head suspension having a longitudinal length with opposite proximal and distal ends, a support region of the head suspension adjacent the proximal end, a head carrying region of the head suspension adjacent the distal end, the support region supports the head carrying region for movement of the head carrying region relative to the support region, a void is positioned between the support region and the head carrying region and a tether of low stiffness material extends across the void connecting the support region to the head carrying region and restraining movement of the head carrying region relative to the support region; and the head suspension has opposite lateral side edges and the void is one of a pair of voids positioned laterally outside the opposite lateral side edges of the head suspension, and the tether is one of a pair of tethers of low stiffness material connecting the support region to the head carrying region, each tether of the pair of tethers extends across a lateral side edge at the support region and at the head carrying region of the head suspension and at least a portion of each tether is positioned laterally outside and spaced from a lateral side edge of the head suspension.

19. The head suspension of claim 18, wherein the head suspension has a spring region longitudinally between the support region and the head carrying region and laterally between the pair of voids and the pair of tethers.

* * * * *